United States Patent Office.

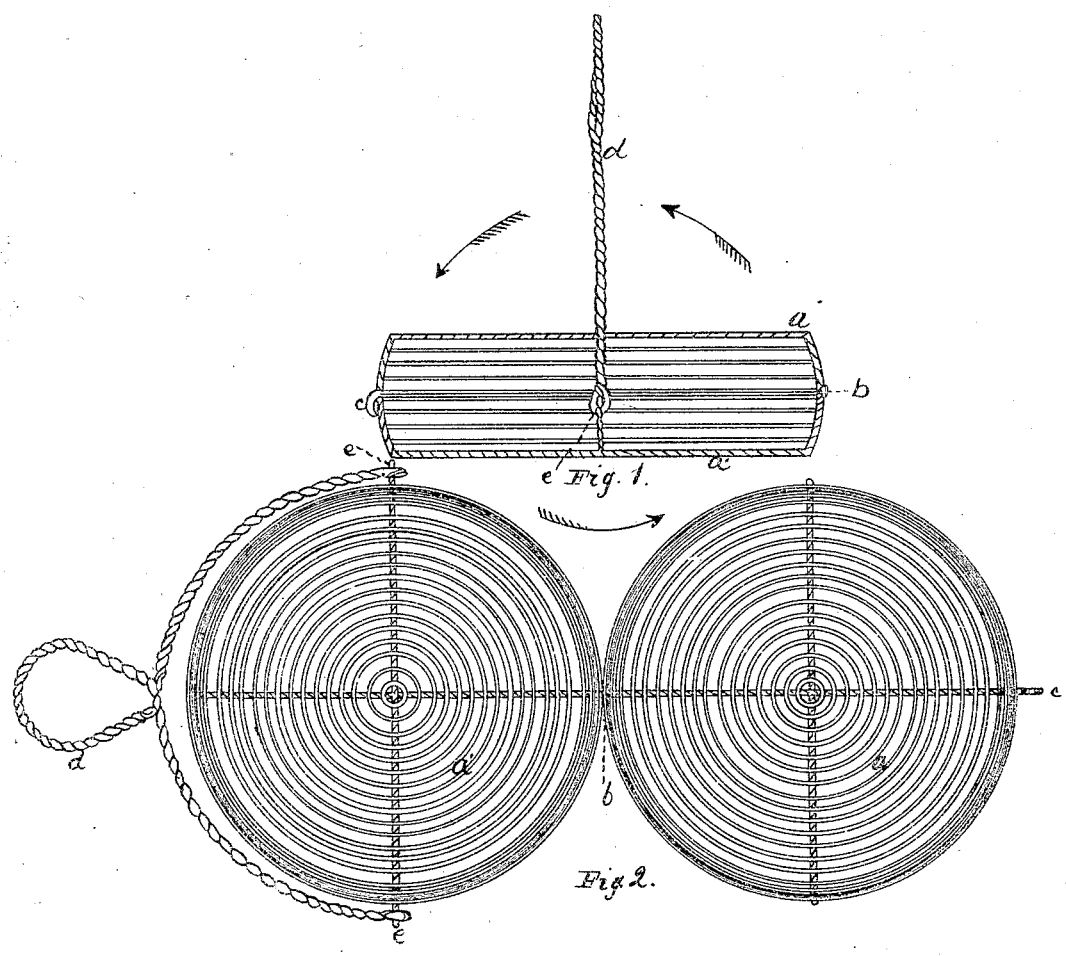

FREDERIC BUCKNAM, OF PORTLAND, MAINE.

Letters Patent No. 73,692, dated January 28, 1868; antedated January 11, 1868.

---

REVERSIBLE FRYING-RACK.

---

*The Schedule referred to in these Letters Patent and making part of the same.*

---

TO ALL WHOM IT MAY CONCERN:

Be it known, that I, FREDERIC BUCKNAM, of Portland, in the county of Cumberland, and State of Maine, have invented a new and useful Reversible Frying-Rack; and I hereby declare the following to be a full, clear, and exact description thereof, which will enable others to make and use my invention, reference being had to the accompanying drawings, forming part of this specification, in which—

Figure 1 is a side view of my invention.

Figure 2 a top plan, with the bail thrown down at one side, and the two parts of the rack opened.

I desire to obtain Letters Patent on a device for containing articles while being fried in a dish, such as is usually employed for that purpose, and, when thus used, contains fat, lard, &c. Such a dish is usually flat-bottomed, shallow, and open on the top.

My invention is designed to contain the article to be cooked or fried, and to be placed, with its contents, down into the hot fat or other substance in the frying-pan or dish. For convenience in thus manipulating my invention, a bail or handle is attached thereto, which I will hereafter designate.

My invention is composed of two parts, hollow or concave on their inner sides. These two parts are the same diameter, and match one upon the other. They are shown at $a$ $a'$. At $b$ is a hinge or joint, by which they are attached to each other, and upon which they open and close. When closed, they are fastened by a catch, $c$. Upon the part $a'$ is attached the bail or handle $d$, at the pivots $e$, as can be seen in fig. 2. The bail or handle is over the two pivots $e$. This is so connected as to allow the two parts $a$ $a'$, when united, as in fig. 1, to be turned over, as indicated by the arrows in fig. 1, in both directions, backward or forward. The purpose of this arrangement is as follows: When the articles have been placed in the frying-dish, with one side down, and have been sufficiently cooked upon such under side, then the device can be lifted from the frying-pan by the bail, the body $a$ $a'$ reversed, and then the top, or portion of the articles not cooked, may be placed in the frying-pan, while the parts before cooked or fried may be kept out. Thus a number of cakes or other articles may be all cooked at the same time, to the same degree, and equally upon both sides. When done, the device is lifted from the pan, opened, its contents removed, and other articles can be submitted to the same process.

In the drawing, the rack is represented as made of concentric rings of wire. It can be so made, and also of sheets of wire netting, struck up to form the edges, by a familiar process not herein claimed, of course, and the edges finished with a tin binding. No particular method of making the material of the rack is, however, claimed, except that the rack must be of some open-worked metal, similar to wire netting, or as seen in the drawing, with the view, as is evident, that the fat or other substance in the frying-pan may enter the rack when it is placed in the pan, as set forth, and also, that when the rack is raised from the pan, the substance in the pan will not remain in the rack. The rack is intended to be made to fit the different shapes of frying-pans. This rack may be made of sizes to fit in and correspond with the different sizes of pans manufactured for different sizes or numbers of stoves and ranges, and is intended to fill the interior of such pans.

What I claim as my invention, and desire to secure by Letters Patent, is—

The reversible frying-rack, substantially as herein set forth and described.

FREDERIC BUCKNAM.

Witnesses:
WM. HENRY CLIFFORD,
HENRY C. HOUSTON.